United States Patent
Korte et al.

(10) Patent No.: US 10,232,739 B1
(45) Date of Patent: Mar. 19, 2019

(54) VEHICLE SEAT HANDLE

(71) Applicant: Honda Motor Co., Ltd., Tokyo (JP)

(72) Inventors: Joseph H. Korte, Marysville, OH (US); Jacob O. Borth, Olathe, KS (US); Robert T. Wilson, III, Delaware, OH (US); Erik Dunshee, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 15/728,099

(22) Filed: Oct. 9, 2017

(51) Int. Cl.
| | |
|---|---|
| *B60N 2/01* | (2006.01) |
| *B60N 2/02* | (2006.01) |
| *B60R 7/04* | (2006.01) |
| *B60N 2/64* | (2006.01) |

(52) U.S. Cl.
CPC .............. *B60N 2/02* (2013.01); *B60N 2/01* (2013.01); *B60N 2/64* (2013.01); *B60R 7/04* (2013.01); *B60R 7/043* (2013.01)

(58) Field of Classification Search
CPC .... B60N 2/02; B60N 2/01; B60N 2/64; B60R 7/04; B60R 7/043
USPC ...................................................... 296/24.34
See application file for complete search history.

(56) References Cited

U.S. PATENT DOCUMENTS

| | | | |
|---|---|---|---|
| 5,816,650 A | 10/1998 | Lucas, Jr. | |
| 6,488,327 B1 * | 12/2002 | Pearse | B60N 2/2863 |
| | | | 296/37.15 |
| 6,843,526 B2 | 1/2005 | Honda et al. | |
| 6,877,807 B2 | 4/2005 | Mizuno et al. | |
| 7,121,371 B2 | 10/2006 | Rondeau et al. | |
| 7,673,920 B2 * | 3/2010 | Nakamura | B60R 11/00 |
| | | | 224/274 |
| 8,905,168 B2 | 12/2014 | Kaku et al. | |
| 8,960,754 B1 * | 2/2015 | Maeda | B60R 11/06 |
| | | | 224/275 |
| 9,156,517 B2 | 10/2015 | Kaita et al. | |
| 9,393,894 B2 * | 7/2016 | Steinmetz | B60N 3/06 |
| 2012/0212013 A1 * | 8/2012 | Ripley | B62J 25/00 |
| | | | 297/195.13 |
| 2013/0241228 A1 * | 9/2013 | Nakamura | B62D 21/186 |
| | | | 296/26.08 |
| 2014/0265285 A1 | 9/2014 | Erspamer | |
| 2015/0041237 A1 * | 2/2015 | Nadeau | B60K 5/00 |
| | | | 180/292 |
| 2017/0028881 A1 | 2/2017 | Proulx et al. | |
| 2017/0247058 A1 * | 8/2017 | Hokes | B60R 21/13 |
| 2018/0056882 A1 * | 3/2018 | Osterhoff | B60N 2/682 |
| 2018/0272988 A1 * | 9/2018 | Korte | B60R 21/13 |

FOREIGN PATENT DOCUMENTS

JP          3070810 B2       7/2000

\* cited by examiner

*Primary Examiner* — Pinel E Romain

(74) *Attorney, Agent, or Firm* — Honda Patent & Technologies North America, LLC; Clifford B Vaterlaus (57) ABSTRACT

A vehicle seat includes a seat back and a seat cushion supported on a frame. The seat cushion is removable from the frame to allow access to an area beneath the seat. The seat cushion includes a cushion member forming a seating surface. A handle is formed on the cushion member to facilitate grasping the seat cushion to allow the seat cushion to be removed from the frame.

20 Claims, 6 Drawing Sheets

VEHICLE SEAT HANDLE

BACKGROUND

The disclosed subject matter relates generally to vehicle seats. More particularly, the disclosed subject matter relates to vehicle seats having features to facilitate removal of portions of the seats.

Some vehicles have storage compartments or equipment located under the seats. For example, tool kits, batteries, fuse boxes, fuel tanks and the like may be located under the seats. Accordingly, it may be desirable to remove the seat bottom to facilitate access to the storage compartment or equipment located under the seat. In other situations, it may be desirable to remove the seat bottom for cleaning purposes. Some seat bottoms are difficult to grasp, making removal of the seat bottom cumbersome.

It would therefore be desirable to provide a seating system with a seat bottom that can be easily removed to access areas beneath the seat. It would also be desirable to provide a seat bottom that is easy to grasp and manipulate.

SUMMARY

In accordance with one embodiment of the present disclosure, a seating system for a vehicle is provided. The seating system includes a pair of seats arranged in a side-by-side configuration. The seats have a seat cushion supported on a seat frame, and a seat back. A console is positioned between the pair of seats on an inboard side of the seats. At least one of the pair of seats includes a handle disposed on the inboard side of the seat cushion for grasping the seat cushion to remove the seat cushion from the seat frame.

In accordance with another embodiment of the present disclosure, a seating system for a vehicle includes a seat cushion for being attached to a seat frame to define part of a seating surface for an occupant of the vehicle. The seat cushion is removable from the seat frame to allow access to a space below the seat cushion. The seat cushion includes a cushion member that extends laterally to define a projecting portion of the seat cushion. The seat cushion is asymmetrical with respect to a centerline of the seat cushion extending in a front to back direction as viewed from above, and a handle is formed at least partially in the projecting portion.

In accordance with yet a further embodiment of the present disclosure, a seating system for a vehicle includes a seat cushion for being attached to a seat frame to define part of a seating surface for an occupant of the vehicle. The seat cushion is removable from the seat frame to allow access to a space below the seat cushion. The seat cushion includes a cushion member for supporting the occupant on an upper portion. An underside of the cushion member comprises a recess defining part of a handle for grasping the seat cushion to remove the seat cushion from the seat frame.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-8, wherein like numbers indicate the same or corresponding elements throughout the views.

Figure 1:
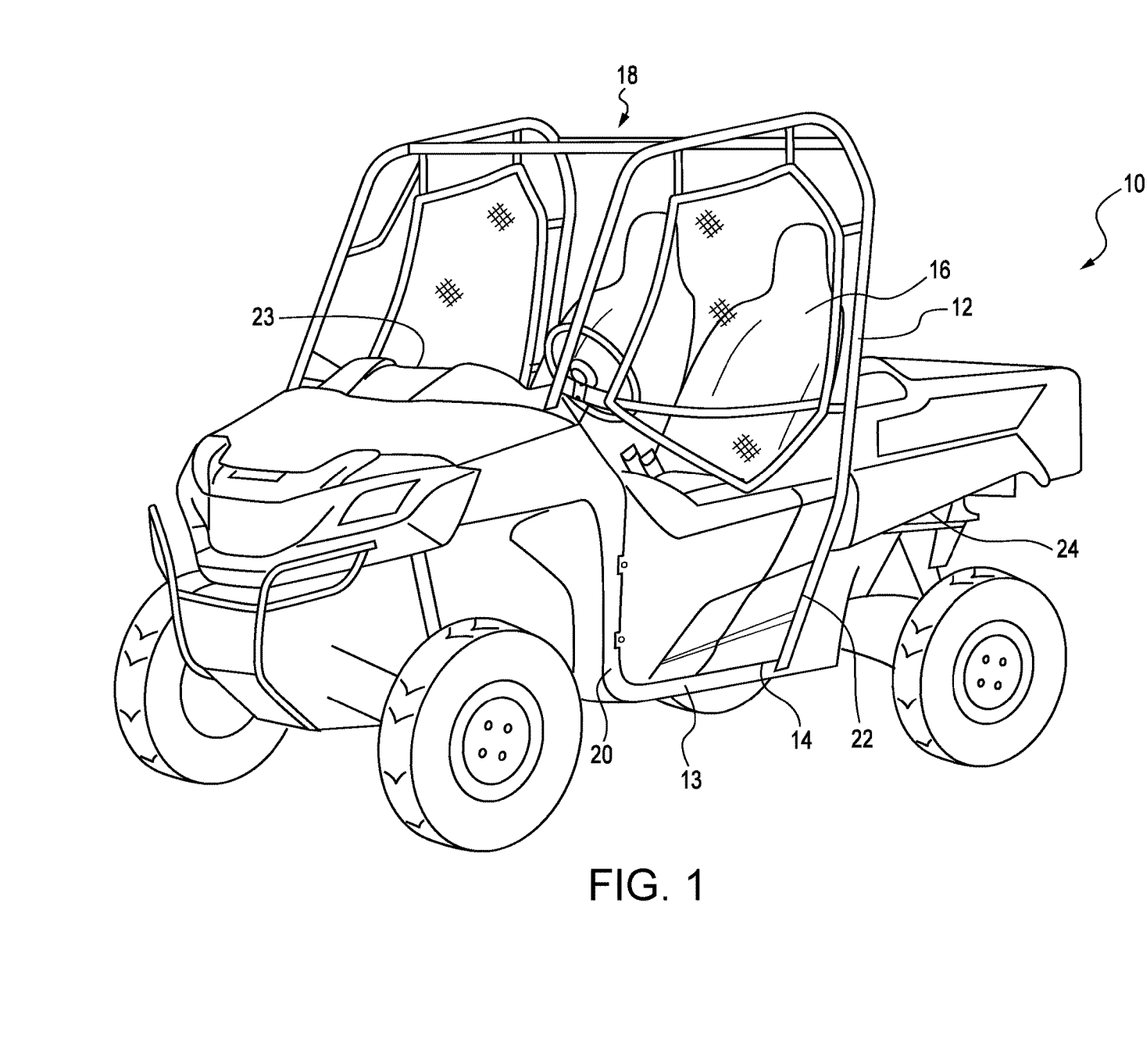
FIG. 1 is a front perspective view depicting a vehicle in accordance with one embodiment of the present disclosure.

FIG. 1 illustrates a perspective view of a vehicle, indicated generally at 10, in accordance with one embodiment of the present disclosure. The vehicle 10 is shown as an off-road vehicle. However, vehicles in accordance with alternative embodiments can comprise any variety of vehicles, including automobiles, trucks, vans, recreational vehicles, utility vehicles, agricultural equipment, or construction equipment, for example.

The vehicle 10 may include a vehicle frame 12 comprised of a plurality of frame members 13. The frame members 13 may be tubular and may be connected together by welding or fasteners, for example. The vehicle frame 12 may include a plurality of base members 14 for supporting at least one seat 16 in an occupant area, indicated generally at 18. The frame 12 may include a pair of front upright members 20 extending in an upward direction with respect to the base members 14 and positioned at a forward portion of the occupant area 18. The frame 12 may also include a pair of rear upright members 22 extending in an upward direction with respect to the base members 14 and positioned at a rearward portion of the occupant area 18. The front upright members 20 and the rear upright members 22 may form part of a roll protection structure that is particularly suitable for use in off-road vehicles. It will be understood that other embodiments of the vehicle 10 may have different configurations with more upright members or fewer upright members.

It will be appreciated that the seats 16 may be arranged in any suitable manner, and may include bucket seats to provide seating surfaces for occupants of the vehicle 10. The seats 16 may be arranged in a side-by-side configuration, and may be arranged in a single row or multiple rows within the scope of the present disclosure.

The vehicle 10 may include an engine 24, such as an internal combustion engine or an electric motor, of any suitable size and configuration for providing a motive power to the vehicle 10. In one embodiment, the engine 24 may be supported by the vehicle frame 12 at a location behind the seats 16. However, in alternative embodiments, the engine 24 may be located in a central or front portion of the vehicle 10.

Figure 2:
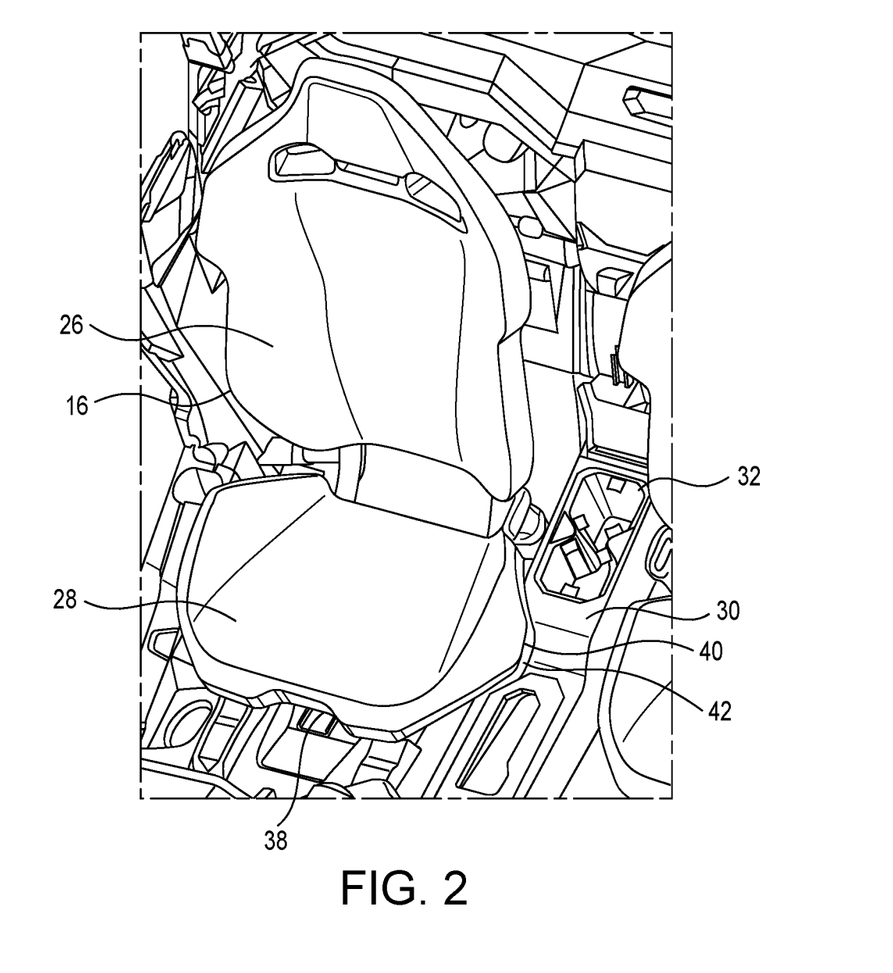
FIG. 2 is a top perspective view of a seat and a portion of the vehicle in accordance with the concepts of the present disclosure.

Referring to FIG. 2, which depicts a top perspective view of a seat 16 and a portion of the vehicle 10 in accordance with the concepts of the present disclosure. The seat 16 may include a seat back 26 for supporting a back of a seated occupant, and a seat bottom 28, also referred to herein as a seat cushion 28. A console 30 may be positioned between the seats 16 on an inboard side of the seats 16. The console 30 may extend from between the seats 16 to a position forward of the seats 16. The console 30 may include one or more cup holders 32 and/or any variety of control devices, including levers, knobs, handles, buttons, and switches, or storage compartments, or the like, in a manner known to those skilled in the art.

Figure 3:
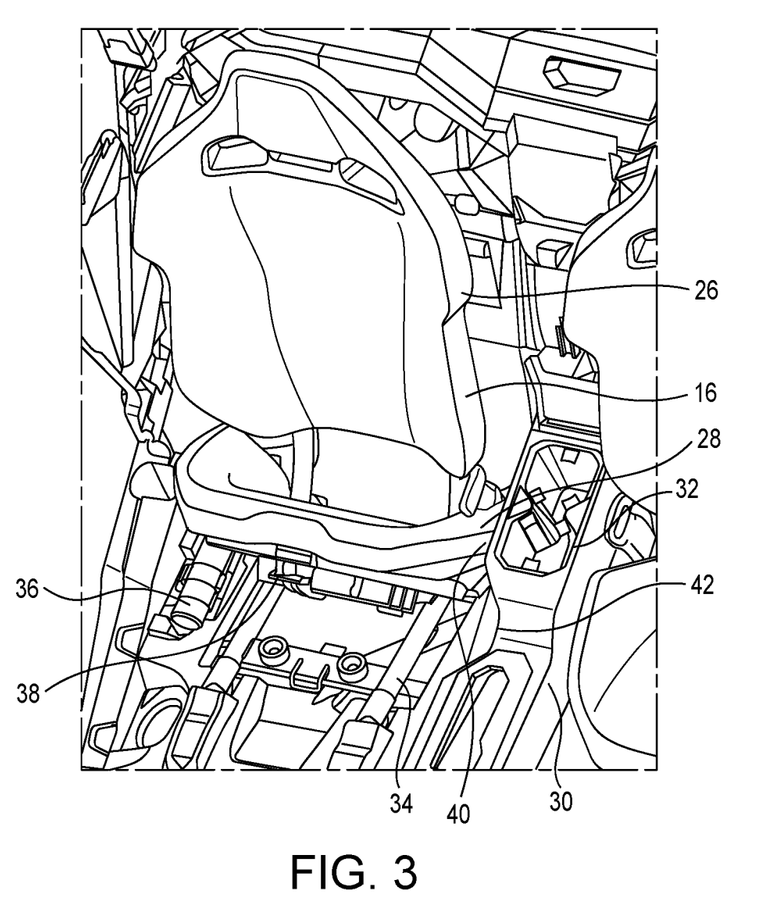
FIG. 3 is a top perspective view of the vehicle seat of FIG. 2 with the seat cushion lifted.

The seat cushion 28 may be supported by a seat frame 34, as shown more clearly in FIG. 3, which depicts a top perspective view of the seat 16 with the seat cushion 28 raised. The seat cushion 28 may be removable from the seat frame 34 to access areas beneath the seat 16. For example, a storage compartment 36 may be provided under the seat 16 for storing objects such as tools. It will be understood that the storage compartment 36 may be formed in any suitable configuration for storing any variety of objects. It will also be understood that other embodiments of the vehicle 10 that may or may not include a storage compartment 36, may include equipment under the seat that may need to be accessed. For example, some embodiments of the vehicle 10 may include equipment, such as batteries, fuse boxes, fuel tanks and the like, located under the seats. In other embodiments, removal of the seat cushion 28 may facilitate cleaning dirt and debris that sometimes accumulates in off-road vehicles under the seat 16. Accordingly, some embodiments of the vehicle 10 may not include a storage compartment 36 or other equipment under the seat cushion 28, but may still benefit from having a removable seat cushion 28.

The seat cushion 28 may include a latch 38, discussed more fully below, for holding the seat cushion 28 to the seat frame 34. When the seat cushion 28 is unlatched from the frame 34, the seat cushion 28 may be lifted off the frame 34. A handle 40 may be provided in the seat cushion 28 to facilitate grasping and handling the seat cushion 28 so that the seat cushion 28 can be easily removed and replaced on the seat frame 34. The handle 40 may be positioned on one or both of the seats 16 on the inboard side of the seat 16 adjacent to the console 30. Accordingly, the console 30 may include a recess 42 for receiving the handle 40 portion of the seat cushion 28.

Figure 4:
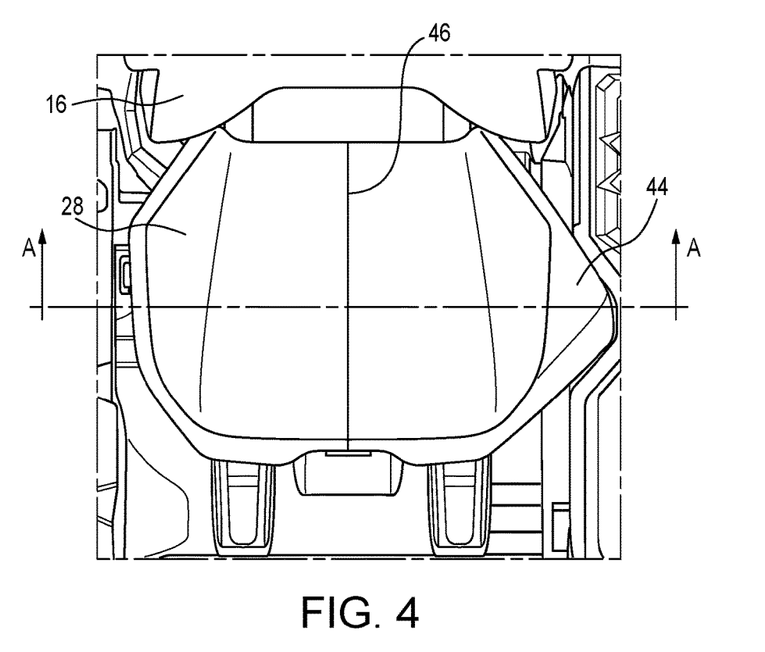
FIG. 4 is a top view of the seat cushion of the seat of FIG. 2.

Referring to FIG. 4, which shows a top view of the seat cushion 28, the seat cushion 28 may extend laterally to define a projecting portion 44 of the seat cushion 28. Accordingly, the seat cushion 28 may be asymmetrical as viewed from above with respect to a centerline 46 of the seat cushion 28 extending in a front to back direction. The projecting portion 44 of the seat cushion 28 may extend in an inboard direction toward a centerline of the vehicle 10. The handle 40 may be formed at least partially in the projecting portion 44 of the seat cushion 28 such that the projecting portion 44 provides a visual indicator of the handle 40, and the projecting portion 44 also provides a portion of the seat cushion 28 to be grasped by a user.

Figure 5:
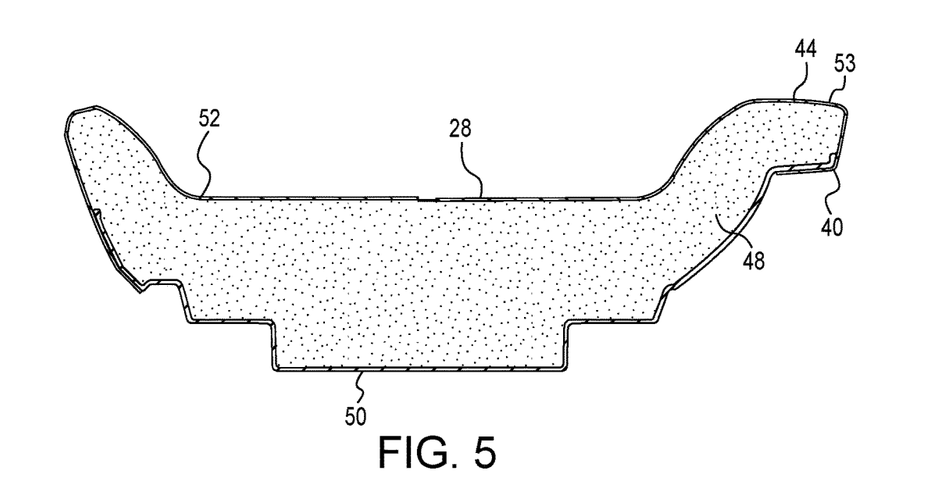
FIG. 5 is a cross-sectional view of the seat cushion of FIG. 4, taken along line A-A.

As shown in FIG. 5, which shows a cross-sectional view of the seat cushion 28 of FIG. 4 taken along line A-A, the seat cushion 28 may include a cushion member 48 forming an upper portion of the seat cushion 28. The cushion member 48 may be formed of a foam material or any other suitable material for providing a comfortable seating surface for an occupant of the vehicle 10. The seat cushion 28 may also include a support member 50 forming a lower portion of the seat cushion 28. The support member 50 may be configured to provide support to the cushion member 48, and thus may have a higher rigidity than the cushion member 48. The support member 50 may have portions extending substantially horizontally to provide a bottom of the seat cushion 28, and upward extending portions to provide a side of the seat cushion 28. In one embodiment, the support member 50 may be formed of a plastic material. However, it will be understood that the support member 50 may be formed of any suitable material, and the support member 50 may configured as desired to provide appropriate vertical and lateral support to the cushion member 48.

The seat cushion 28 may also include a trim cover 52. The trim cover 52 may cover a portion of the cushion member 48 and the support member 50 to provide protection and an aesthetically pleasing surface to the seat cushion 28. The trim cover 52 may be formed of a flexible, durable material, such as vinyl, leather or the like.

It will be understood that the handle 40 may be configured such that an upper surface 53 of the handle 40 will form a portion of the seating surface for an occupant of the vehicle 10. The cushion member 48 may be configured to extend in the projecting portion 44 so that the seat 16 can be soft and comfortable for an occupant seated on the handle 40 portion of the seat 16. In other words, the seat 16 is configured such that an occupant can comfortably sit on the projecting portion 44 of the seat cushion 28 where the handle 40 is formed.

Figure 6:
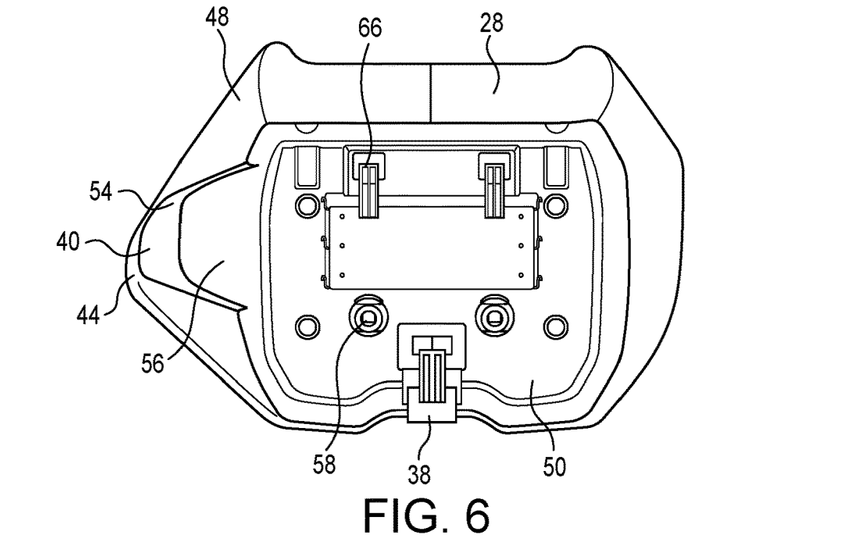
FIG. 6 is a bottom view of one embodiment of the seat cushion.

Referring to FIG. 6, which discloses a bottom view of one embodiment of the seat cushion 28, the handle 40 may include a recess 54 in an underside of the cushion member 48 in the projecting portion 44. The recess 54 may be sized and configured to receive fingers or a hand of a user to provide a gripping surface. The support member 50 may include a handle support 56 extending in the recess 54 in the projecting portion 44 to provide additional strength to the handle 40. The handle support 56 may have a portion that extends substantially horizontally so that it can provide a surface area for a user to apply a vertical force to lift the seat cushion 28. In addition, the handle support 56 may be configured to provide support for the cushion member 48 when an occupant of the vehicle 10 is seated on the projecting portion 44 of the seat cushion 28.

Figure 7:
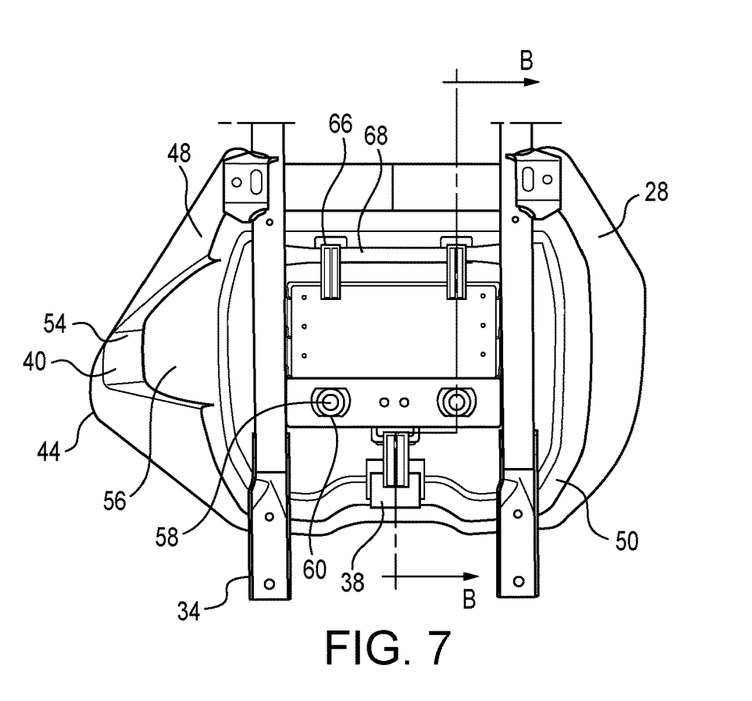
FIG. 7 is a bottom view of the seat cushion of FIG. 6 including a portion of a seat frame.
Figure 8:
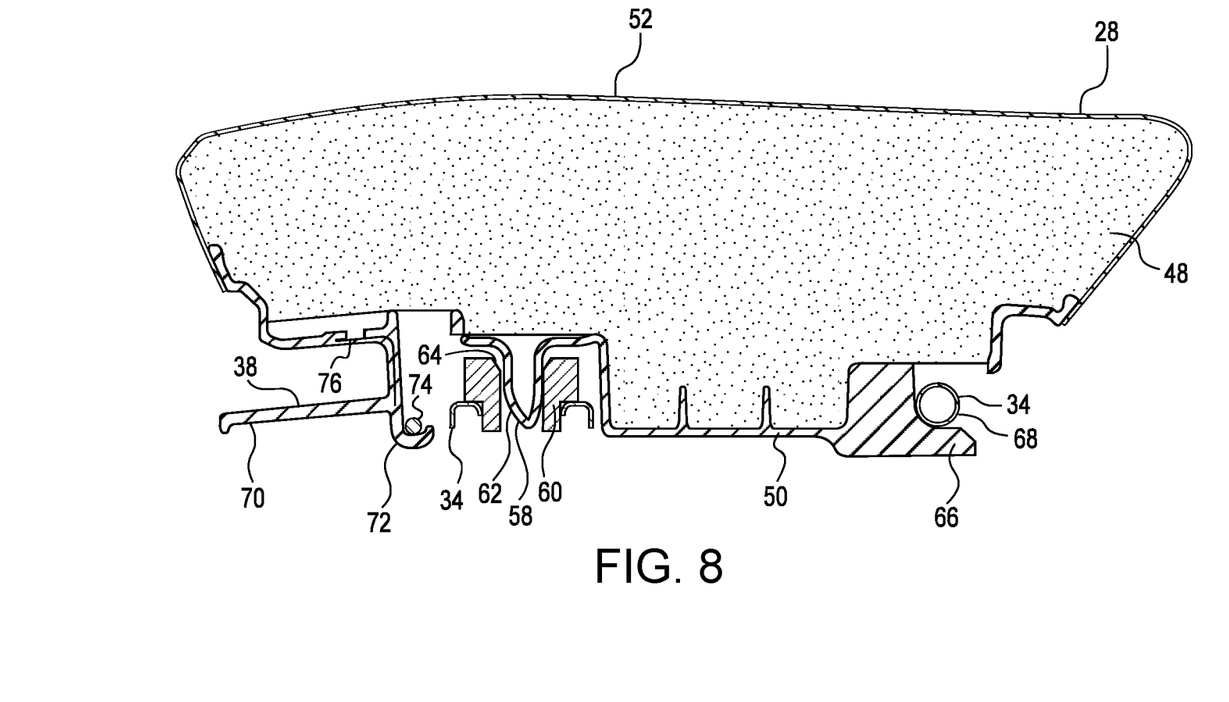
FIG. 8 is a cross-sectional side view of the seat cushion of FIG. 7, taken along line B-B.

The seat cushion 28 may also include one or more pins 58 for locating the seat cushion 28 appropriately with respect to the seat frame 34 for attaching the seat cushion 28 to the seat frame 34, as shown in FIGS. 7 and 8. FIG. 7 discloses a bottom view of the seat cushion 28 of FIG. 6 including a portion of the seat frame 34. FIG. 8 discloses a cross-sectional side view of the seat cushion 28 of FIG. 7, taken along line B-B. The pin 58 may be received in a bumper 60 attached to the seat frame 34. The pin 58 may be integral with the support member 50, or the pin 58 may be a separate member attached to the support member 50. As shown in FIG. 8, the pin 58 may have a tapered end 62 for facilitating insertion into the bumper 60. The bumper 60 may be a cylindrical member with an interior space configured to receive the pin 58. The bumper 60 may include a sloped opening 64 to further guide the pin 58 into the bumper 60. One embodiment of the bumper 60 may be formed of a resilient material, such as rubber, to absorb vibrations traveling between the seat frame 34 and the seat cushion 28. Also, the resilient material of the bumper 60 may allow the bumper 60 to compress to hold the pin 58 in the bumper 60, and to bias the seat cushion 28 to a predetermined position with respect to the seat frame 34. Thus, the bumper 60 may be configured as a biasing member to allow a small amount of movement of the seat cushion 28 with respect to the seat frame 34. This may be beneficial in positioning and latching the seat cushion 28 to the seat frame 34.

The seat cushion 28 may also include one or more hooks 66 disposed on an opposite side portion of the seat cushion 28 as the latch 38. In the embodiment of the seat cushion 28 depicted, the hooks 66 may be positioned on a rearward portion of the seat cushion 28, and the latch 38 may be positioned on a forward portion of the seat cushion 28. The hooks 66 may be configured for attaching the seat cushion 28 to the seat frame 34 such that when the latch 38 is released, the seat cushion 28 can pivot about the seat frame 34 at the hooks 66. Accordingly, a seat attachment portion 68 of the seat frame 34 may have a rounded cross-sectional shape to facilitate pivotal movement of the seat cushion 28. In the embodiment disclosed, the seat attachment portion 68 of the seat frame 34 may have a cylindrical configuration. However, alternative embodiments may have different suitable configurations.

Referring now in greater detail to the latch 38 mentioned above, the latch 38 may be integrally formed in the support member 50 of the seat cushion 28. Alternatively, the latch may be a separate member attached to the seat cushion 28. The latch 38 may include a latch handle 70 for operating the latch 38, and a latch hook 72 for attaching to a receiver 74 formed in the seat frame 34. The receiver 74 may be formed as a loop, plate, hook or the like for providing an attachment area for the latch hook 72. The latch 38 may also include a hinge 76 for allowing the latch hook 72 to be moved with respect to the receiver 74. In one embodiment, the hinge 76 may be a living hinge formed in the support member 50. Alternatively, the hinge 76 may be a separate structure attached to the support member 50 of the seat cushion 28.

In use, when an operator wishes to remove the seat cushion 28 from the seat frame 34, the user can lift the latch handle 70, which causes the latch handle 70 and the latch hook 72 to pivot about the hinge 76 and thereby release the latch hook 72 from the receiver 74. The seat cushion 28 can then be lifted at the front portion by the latch handle 70 so that the seat cushion 28 pivots about the seat attachment portion 68 of the seat frame 34. The user can then grasp the handle 40 and lift the seat cushion 28 off the seat frame 34. Access to the area beneath the seat cushion 28 can thereby be accomplished.

To replace the seat cushion 28 on the seat frame 34, the hooks 66 can be placed on the seat attachment portion 68 of the seat frame 34. Lateral movement of the seat cushion 28 can be facilitated by grasping the handle 40 to align the pins 58 with the bumpers 60. Then the front of the seat cushion 28 can be lowered until the pins 58 are received in the bumpers 60. Once the front of the seat cushion 28 is lowered, the latch hook 72 snaps on to the receiver 74 to hold the seat cushion 28 in place with respect to the seat frame 34.

It will be understood that the seat cushion 28 may be easily moved and manipulated using the handle 40 when a user is standing outside the vehicle 10, since the handle 40 is located on an inboard side of the seat 16, the seat cushion 28 can be easily gripped and pulled toward the user.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A seating system for a vehicle comprising:
a pair of seats arranged in a side-by-side configuration, each of the seats having a seat cushion supported on a seat frame, and a seat back;
a console positioned between the pair of seats on an inboard side of the seats;
at least one of the pair of seats comprising a handle disposed on the inboard side of the seat cushion for grasping the seat cushion to remove the seat cushion from the seat frame.

2. The seating system of claim 1 further comprising a storage compartment beneath the at least one of the pair of seats.

3. The seating system of claim 1 wherein the seat cushion comprises a cushion member forming an upper portion of the seat cushion, and a support member forming a lower portion of the seat cushion, the support member having a higher rigidity than the cushion member.

4. The seating system of claim 3 wherein the cushion member and the support member extend laterally to form a projecting portion of the seat cushion such that the seat cushion is asymmetrical as viewed from above with respect to a centerline of the seat cushion extending in a front to back direction.

5. The seating system of claim 4 wherein the handle is arranged at least partially in the projecting portion.

6. The seating system of claim 5 wherein a recess is formed in the console for receiving the projecting portion.

7. The seating system of claim 3 wherein an underside of the cushion member comprises a recess defining part of the handle for grasping the seat cushion to remove the seat cushion from the seat frame.

8. The seating system of claim 1 wherein the seat cushion comprises a latch for fixing the seat cushion to the seat frame.

9. The seating system of claim 8 wherein the seat cushion comprises a hook disposed on an opposite side of the seat cushion as the latch, the hook attaching to the seat frame such that when the latch is released, the seat cushion can pivot about the seat frame at the hook.

10. The seating system of claim 1 wherein the handle comprises a recess on an underside of the seat cushion.

11. A seating system for a vehicle comprising:
a seat cushion for being attached to a seat frame to define part of a seating surface for an occupant of the vehicle, the seat cushion being removable from the seat frame to allow access to a space below the seat cushion, the seat cushion comprising a cushion member, the cushion member extending laterally to form part of a projecting portion of the seat cushion such that the seat cushion is asymmetrical with respect to a centerline of the seat cushion extending in a front to back direction as viewed from above, and a handle is formed at least partially in the projecting portion.

12. The seating system of claim 11 wherein the cushion member forms an upper portion of the seat cushion, and a support member forms a lower portion of the seat cushion, the support member having a higher rigidity than the cushion member.

13. The seating system of claim 12 wherein the handle comprises a handle support portion of the support member extending in the projecting portion of the seat cushion.

14. The seating system of claim 11 wherein the handle comprises a recess in an underside of the cushion member.

15. The seating system of claim 11 wherein the handle is disposed on an inboard side of the seat cushion.

16. A seating system for a vehicle comprising:
a seat cushion for being attached to a seat frame to define part of a seating surface for an occupant of the vehicle, the seat cushion being removable from the seat frame to allow access to a space below the seat cushion, the seat cushion comprising a cushion member on an upper portion of the seat cushion for supporting the occupant, and wherein an underside of the cushion member comprises a recess defining part of a handle for grasping the seat cushion to remove the seat cushion from the seat frame.

17. The seating system of claim 16 wherein the seat cushion comprises a support member forming a lower portion of the seat cushion, the support member having a higher rigidity than the cushion member, and wherein the handle comprises a handle support portion of the support member extending in the recess.

18. The seating system of claim 17 wherein the handle support portion extends substantially horizontally.

19. The seating system of claim 16 wherein the handle is disposed on an inboard side of the seat cushion.

20. The seating system of claim 16 further comprising a trim cover covering the cushion member.

* * * * *